(12) United States Patent
Lambert

(10) Patent No.: US 7,736,115 B2
(45) Date of Patent: Jun. 15, 2010

(54) TRAILER APPARATUS

(76) Inventor: Jorge Omar Lambert, Garay Vivas 2563, 6300 Santa Rosa, Province of la Pampa (AR)

( * ) Notice: Subject to any disclaimer, the term of this patent is extended or adjusted under 35 U.S.C. 154(b) by 497 days.

(21) Appl. No.: 11/784,517

(22) Filed: Apr. 6, 2007

(65) Prior Publication Data

US 2008/0247850 A1    Oct. 9, 2008

(51) Int. Cl.
    *B60P 1/02*    (2006.01)
(52) U.S. Cl. .................. 414/474; 414/484; 414/495; 280/43.23
(58) Field of Classification Search .......... 414/474, 414/476, 484, 495; 280/43.23, 704
    See application file for complete search history.

(56) References Cited

U.S. PATENT DOCUMENTS

| | | | | |
|---|---|---|---|---|
| 2,827,187 A | * | 3/1958 | Elmore | 414/476 |
| 2,835,400 A | * | 5/1958 | Latzke | 280/43.18 |
| 2,838,191 A | * | 6/1958 | Schramm | 414/476 |
| 3,240,506 A | * | 3/1966 | McMullen | 280/43.23 |
| 5,161,814 A | * | 11/1992 | Walker | 280/414.5 |
| 5,433,578 A | * | 7/1995 | Honan, Jr. | 414/476 |
| 5,630,693 A | * | 5/1997 | Sobina | 414/495 |
| 5,775,868 A | * | 7/1998 | Mann | 414/475 |
| 5,887,880 A | * | 3/1999 | Mullican et al. | 280/43.18 |
| 6,857,643 B2 | * | 2/2005 | Neider | 280/43.18 |

* cited by examiner

*Primary Examiner*—James Keenan
(74) *Attorney, Agent, or Firm*—William B. Ritchie

(57) ABSTRACT

A trailer that can be lowered to the floor or ground for loading, and after the trailer is loaded, it can be elevated to a height appropriate for transportation. Six elements are required for the taller to operate: a chassis, two axles (torsion bars), four pivoting arms, four hubs with wheels, two hydraulic cylinders, and a manually operated hydraulic or electric pump.

4 Claims, 6 Drawing Sheets

TRAILER APPARATUS

FIELD OF THE INVENTION

This invention relates to a transportation vehicle, in particular, a van or open-bed animal or cargo trailer that is designed to be towed by a car or truck.

BACKGROUND OF THE INVENTION

Presently, heavy duty cargo trailers are typically built using four wheels that are placed together as close as possible to the trailer's center of gravity. This type of trailer is able to "seesaw" as the trailer remains in a reasonably balanced condition on the four wheels. This type of trailer can be seated on one axle where the position of the four wheels is determined along an arm that is perpendicular to the length of the trailer and measured such that the center of the wheels correspond to the center of gravity of the trailer. Also, two axles can be used. In this case, the wheels are mounted on a suspension system.

Both of these methods of construction have a fixed height and it is not possible to load them without elevating the load by using another system.

Consequently, there is not found in the prior art a trailer such that the trailer can be lowered to facilitate loading and unloading.

DETAILED DESCRIPTION OF THE INVENTION

The essence of the invention is a trailer as shown in the accompanied figures that can be lowered to the floor or ground for loading, and after the trailer is loaded, it can be elevated to a height appropriate for transportation.

The invention is particularly useful for horse transportation where traditional trailers used for such purposes require a large and heavy ramp to move the horses into the trailer. Often when horses step onto the ramp, the trailer may move. The horses also perceive the space underneath the ramp, and compounded with the noise when stepping on the ramp, may cause the animal to refuse to walk onto the trailer or make the operation difficult for the person guiding the animal. The same thing occurs when animals have to be moved out of a trailer. If the animal is afraid, the stepping out of the trailer operation could be rough and the animals might get hurt going onto or out of the exit ramp. Thus, the use of the invention would solve this problem.

Figure 2:
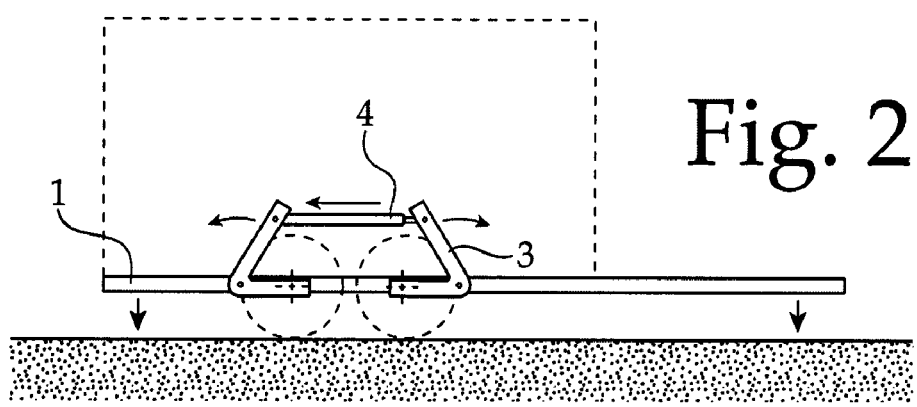
FIG. 2 is a side view of the invention shown in FIG. 1 in a raised position.
Figure 4:
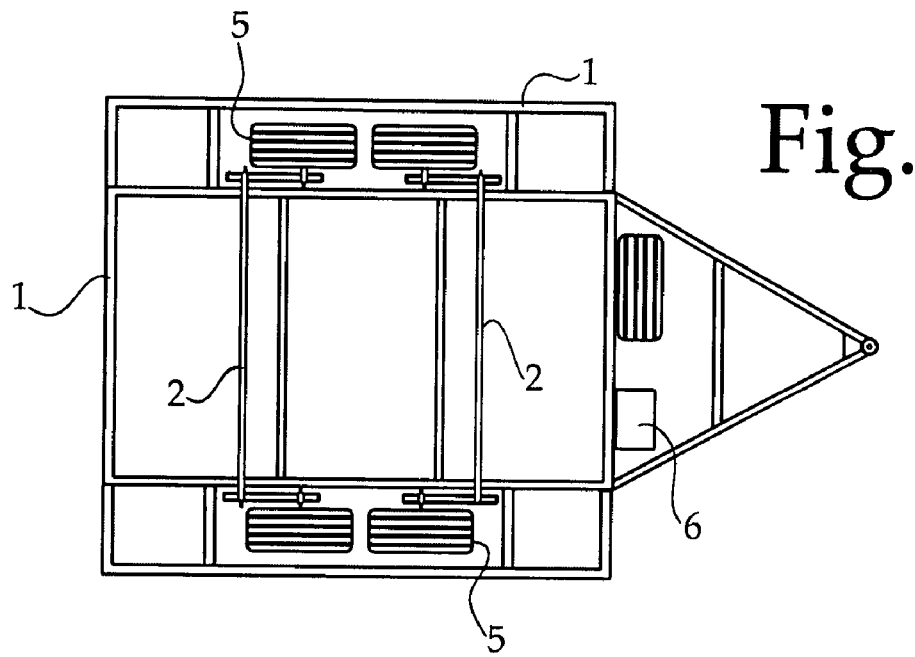
FIG. 4 is an alternative embodiment of the trailer.

The invention can be used with other types of trailers, such as vans, which always have the problem of stairs, level and movement that can to be solved with the use of extensible legs (FIG. 4). In addition, the trailer of the invention is also useful in the transport of cars, avoiding the use of loading ramps and the operation of driving the car through them for loading (FIG. 2). The trailer of the invention is also for boats of every type and every load sensitive to elevation.

Six elements are required for the trailer in accordance with the invention: a chassis 1, two axles (torsion bars) 2, four pivoting arms 3, four hubs with wheels 5, two hydraulic cylinders 4, and a manual operated hydraulic or electric pump 6.

Figure 1:
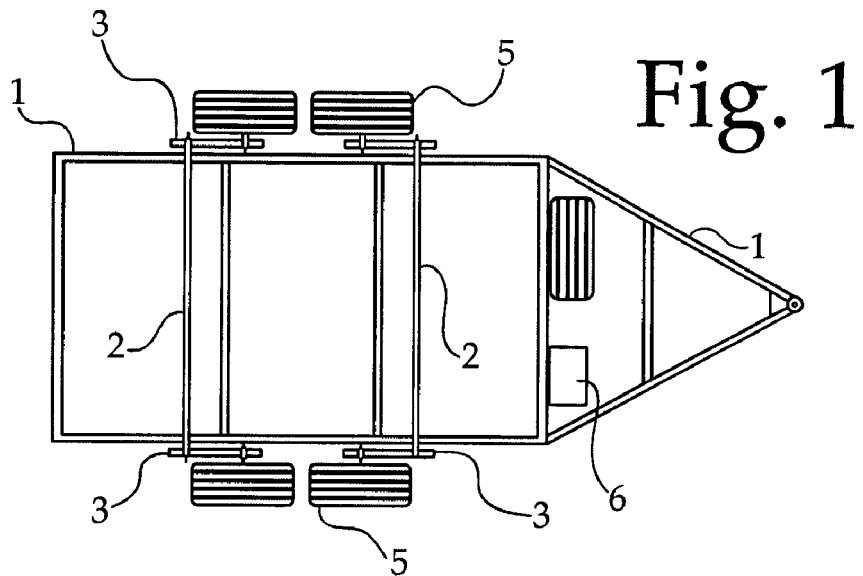
FIG. 1 is a top view of the trailer in accordance with the invention.
Figure 5:
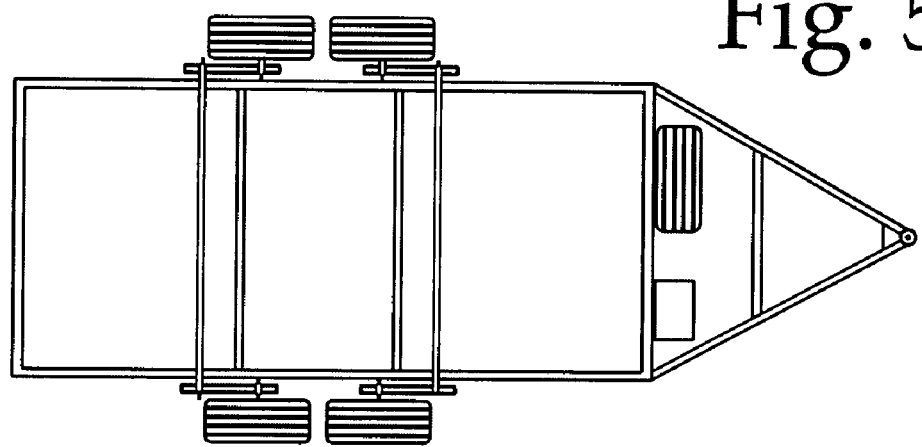
FIG. 5 is a longer version of the trailer shown in FIG. 1.
Figure 6:
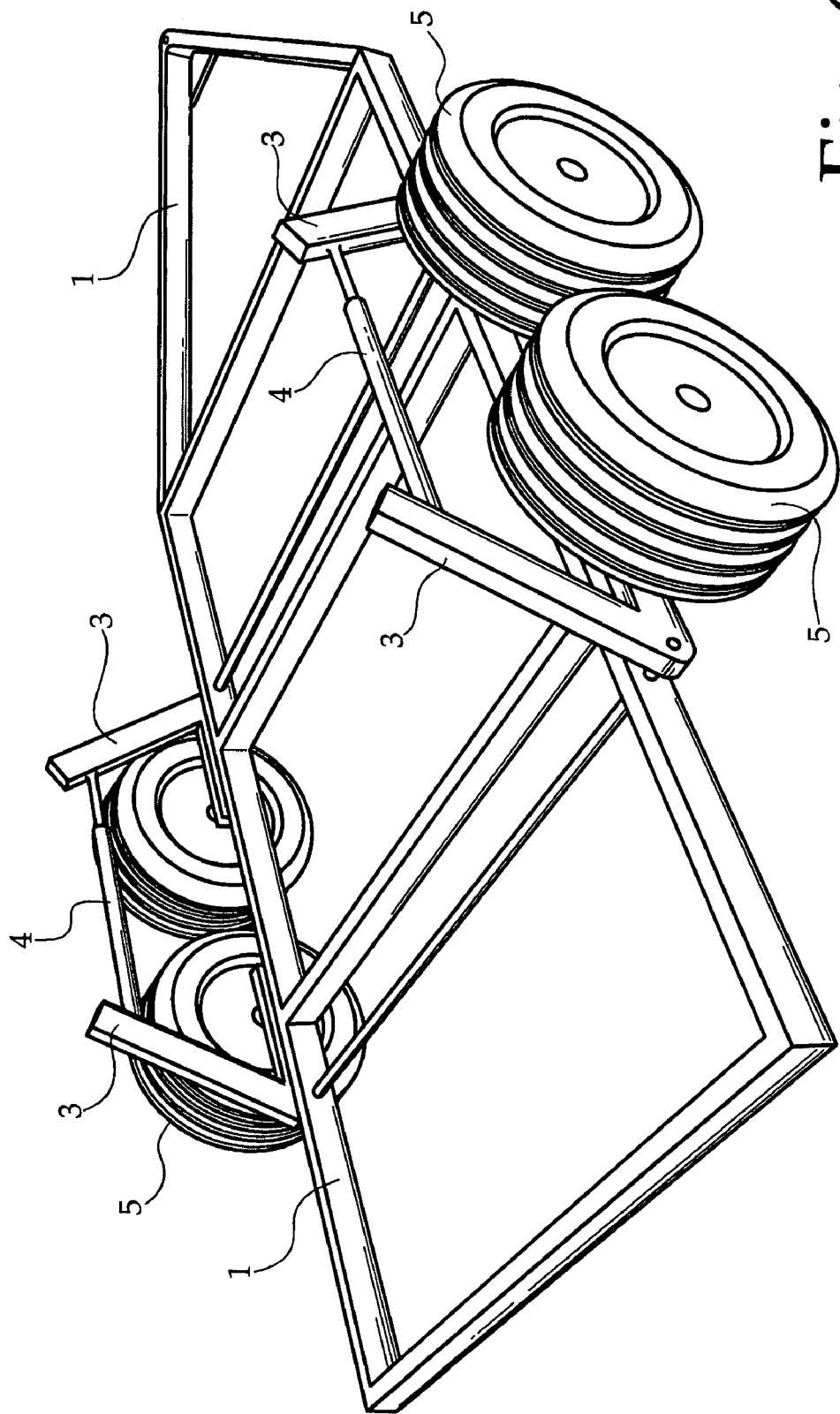
FIG. 6 is an isometric view of the trailer showing the trailer with much of the body removed to show the details of the invention.
Figure 7:
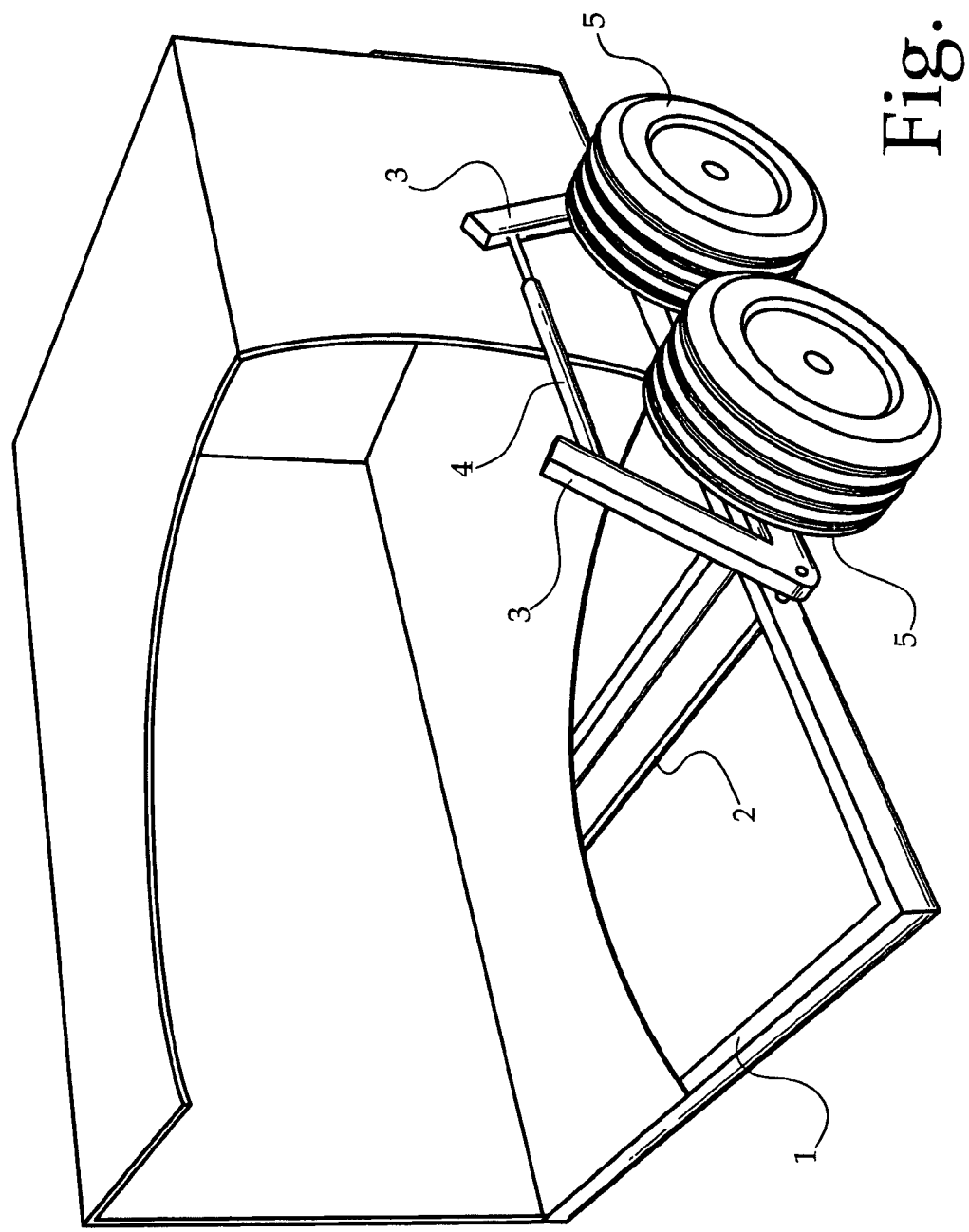
FIG. 7 is a cut-away view of a van-type trailer utilizing the invention.
Figure 9:
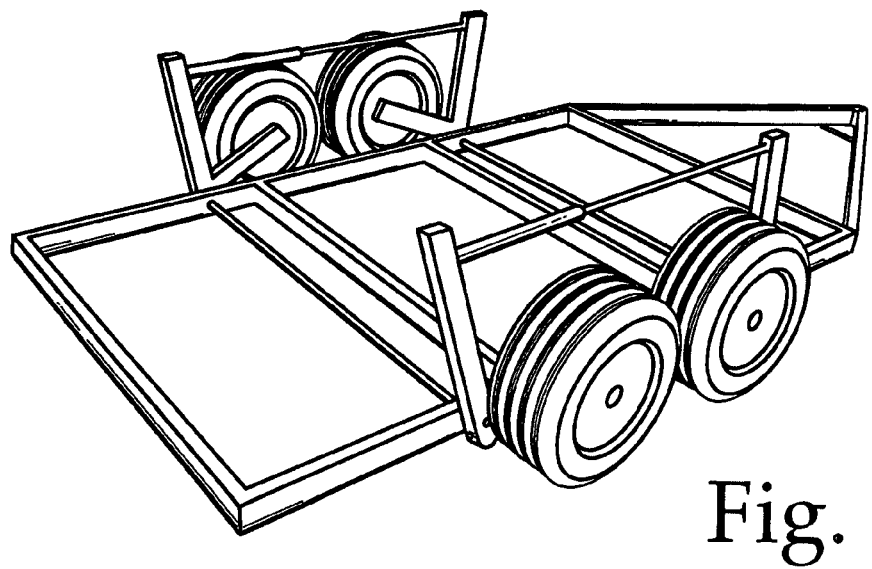
FIG. 9 is an isometric view of the invention as shown in FIG. 6 in the lowered position.
Figure 10:
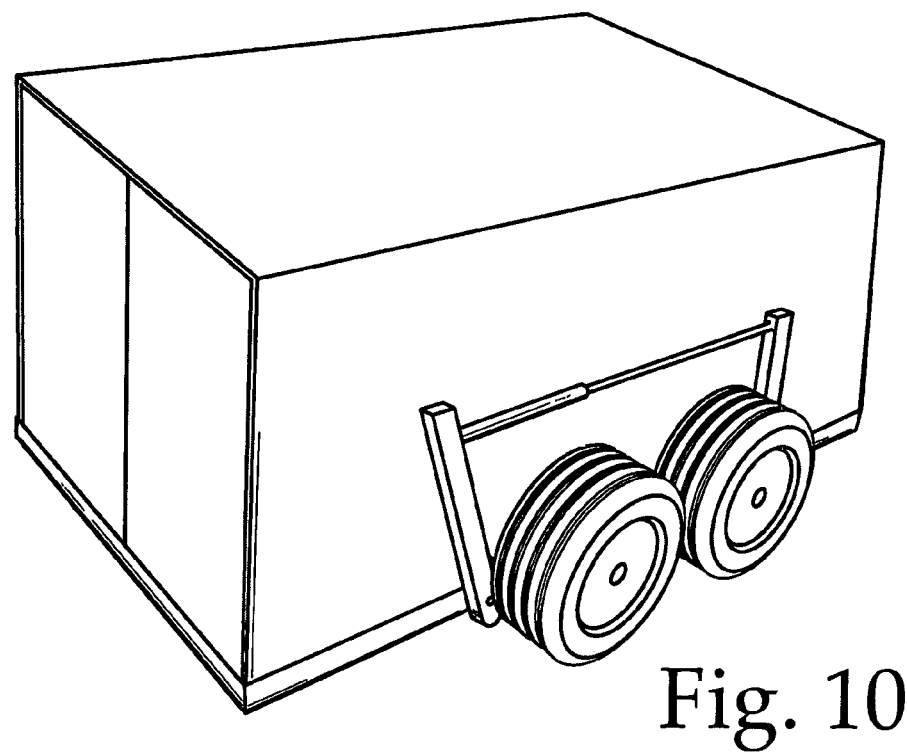
FIG. 10 is the van trailer shown in FIG. 8 in the lowered positioned.

Chassis 1 is a structural type which has to be calculated and designed according to the use of the trailer and the loading variables corresponding to that use. For example, look at the chassis in FIG. 1 as compared to the chassis in FIG. 5 and FIG. 9.

Torsion bars 2 traverse through Chassis 1 and are mounted on axle boxes. Preferably, torsion bars 2 are 30 mm with a torsion capacity of 20°. Torsion bars 2 are preferably made of steel (SAE 5160 or 9254 is preferable.)

Pivoting arms 3 as found in chassis 1 are part of the structure and have to be designed according to the purpose of the trailer. Pivoting arms 3 are attached chassis 1 with axle boxes. The pivoting arms 3 work jointly through the axles, one on the left side with the other on the right side with both pivot arms 3 on the axle boxes. This action causes torsion on the axle and absorbs the unevenness of the surface, thus providing stability to the system.

Hydraulic cylinder 4 is placed on the horizontal portion of the pivoting arms 3 and is approximately 50 cm away from the center of the vehicle axle. The hub of the wheel axle and the vertical portion of the pivoting arm 3 are approximately 60° with respect to one another.

Figure 3:
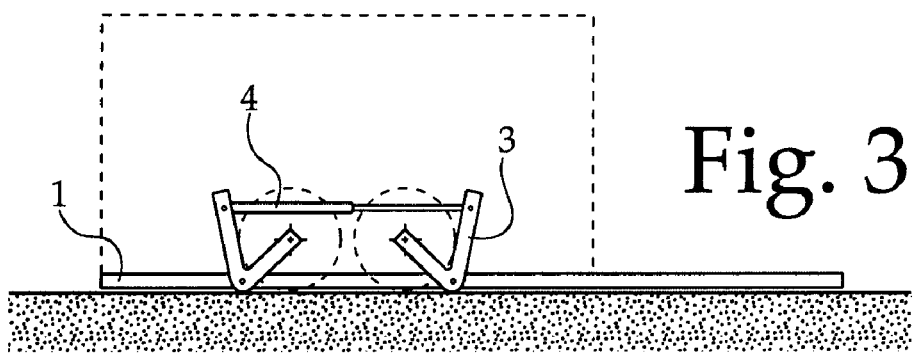
FIG. 3 is a side view of the invention shown in FIG. 1 in a lowered position.

Hydraulic cylinder 4 is connected between the pivoting arms 3 as shown. Hydraulic cylinder lowers and elevates the trailer as shown in FIGS. 2 and 3. Hydraulic cylinder 4 also dampens the vibration on the trailer due to an irregular road surface. As before, the characteristics of this element depend on the loading purposes of the trailer.

As shown, wheels 5 are located on the horizontal ends of pivoting arms 3.

Hydraulic pump 6 is used to operate the pivoting arms 3 either manually or electrically. As before, the design of the pump 6 depends on the use of the trailer and the type of pump required for the operation. In the preferred embodiment, the trailer would have a hydraulic pump 6 for controlling the up and down operation which can be either mechanical or electrical. The selected system will not change the features of the invention.

Figure 8:
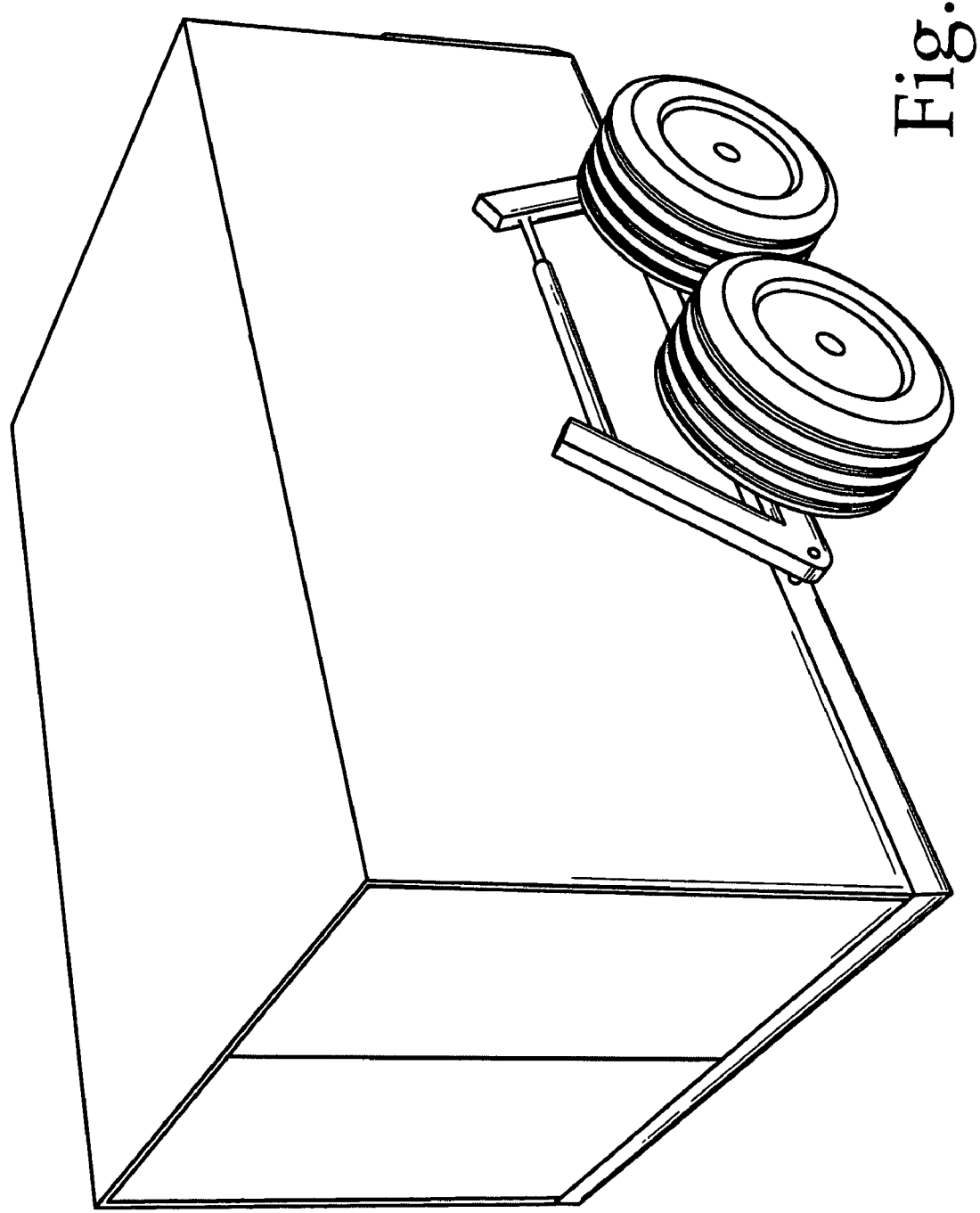
FIG. 8 is an isometric view of the van trailer shown in FIG. 7.

As an example, assume that the trailer's load consists of horses or similar animals. The trailer of the invention would be parked on a place where the back doors can be opened (See FIG. 8). The trailer may or may not be attached to the towing vehicle, depending on the type of towing mechanism used. The hydraulic pump 6 is decompressed so that the hydraulic cylinders 4 cause the wheels to pivot upwards until the trailer is lowered and it touches the floor (See FIG. 9.) The door is then opened and the animals are moved onto the trailer. The door is then closed and the hydraulic pump 6 lowers the wheels, thus placing the wheels 5 in position for driving. Thus, the trailer is raised to the appropriate height depending on the condition of the road (asphalt, dirt, etc.) (See FIG. 8.)

The dimension for an embodiment that is designed to transport four horses has the following approximate dimensions. The structural chassis 1 is approximately 3.4 meters long and two meters wide. The loading for four horses would be approximately 2,000 kg. Two torsion bars 2 are attached to chassis 1 and are mounted on TEFLON axle boxes. The torsion bars 2 are approximately 2.3 meters long. The end of torsion bars 2 are joined to the two pivoting arms 3 with a method of attachment that is sufficient to enable the pivoting arms 3 to rotate on chassis 1 and withstand the structural load. Pivoting arms 3 raise and lower the wheels according to the force exerted by the hydraulic cylinders 4.

As shown in the accompanying drawings, various chassis lengths and configurations are possible.

Although the present invention has been described with reference to certain preferred embodiments thereof, other versions are readily apparent to those of ordinary skill in the art of the preferred embodiments contained herein.

What is claimed is:

1. A trailer having four wheels, one front set and one rear set, said trailer comprising:
    a chassis having a left rail and a right rail defining a left and right side of the trailer, with said rails being substantially parallel to one another;
    a front torsion bar for said front set of wheels; said front torsion bar being mounted on said left and right rails using axle boxes and a rear torsion bar for said rear set of wheels, said rear torsion bar being mounted on said left and right rails using axle boxes such that said front and rear torsion bars are substantially parallel to one another and perpendicular to said left and right rail, wherein said torsion bars absorb the unevenness of a road surface being traveled thereon;
    four V-shaped pivot arms, each pivot arm having a wheel member and a hydraulic member and having a predetermined angle between said wheel member and said hydraulic member, with each said hydraulic member having a hydraulic end, and with each said wheel member having a wheel end, and a pivot point located at the juncture of said wheel member and said hydraulic member, with each said pivot point of each said pivot arm being rotatably attached to said axle boxes of said front and rear torsion bars, and having each of said wheels being attached via hubs to each wheel end of each said pivot arms such that wheel members of said pivot arms attached on the left rail face one another and such that wheel members of said pivot arms attached on the right rail likewise face one another;
    two hydraulic cylinders, each of said hydraulic cylinders having a closed position and an extended position, with each of said cylinders having two attachment ends with each hydraulic cylinder attachment end being attached to a corresponding said hydraulic end of said pivot arms such that when said hydraulic cylinders are in the closed position, said wheels are positioned for travel over a roadway and such that when said hydraulic cylinders are in the extended position, said chassis of said trailer is lowered to the roadway in order to easily load the trailer.

2. The trailer of claim 1 wherein the predetermined angle between said wheel member and said hydraulic member of each said pivot arm is approximately 60 degrees.

3. The trailer of claim 1 further comprising a hydraulic pump attached to said chassis for operating said hydraulic cylinders for raising or lowering said wheels and helping to dampen the vibration of the trailer due to an irregular roadway.

4. The trailer of claim 1 wherein said torsion bars have a torsion capacity of at least 20 degrees.

* * * * *

UNITED STATES PATENT AND TRADEMARK OFFICE
CERTIFICATE OF CORRECTION

| | | |
|---|---|---|
| PATENT NO. | : 7,736,115 B2 | Page 1 of 1 |
| APPLICATION NO. | : 11/784517 | |
| DATED | : June 15, 2010 | |
| INVENTOR(S) | : Jorge Omar Lambert | |

It is certified that error appears in the above-identified patent and that said Letters Patent is hereby corrected as shown below:

Title page, item [57]

In the Abstract, Line 4:

"the taller to operate;" should be

"the trailer to operate;"

Signed and Sealed this

Second Day of November, 2010

David J. Kappos
*Director of the United States Patent and Trademark Office*